(12) United States Patent (10) Patent No.: US 7,921,396 B2
Verplanken et al. (45) Date of Patent: Apr. 5, 2011

(54) DATA ALIGNER IN RECONFIGURABLE COMPUTING ENVIRONMENT

(75) Inventors: Fabrice Jean Verplanken, La Gaude (FR); Jean-Paul Aldebert, Vence (FR); Claude Basso, Raleigh, NC (US); Jean Louis Calvignac, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 12/126,951

(22) Filed: May 26, 2008

(65) Prior Publication Data

US 2008/0229271 A1 Sep. 18, 2008

Related U.S. Application Data

(62) Division of application No. 11/230,956, filed on Sep. 20, 2005, now Pat. No. 7,395,517.

(51) Int. Cl.
*G06F 17/50* (2006.01)
(52) U.S. Cl. .................. 716/116; 716/100; 716/117
(58) Field of Classification Search ............... 716/1, 16, 716/17, 100, 116, 117; 710/105; 712/201, 712/204, 209; 708/208, 209; 709/230, 231; 326/39
See application file for complete search history.

(56) References Cited

U.S. PATENT DOCUMENTS

| | | | |
|---|---|---|---|
| 4,879,731 A | 11/1989 | Brush | 375/368 |
| 5,701,517 A | 12/1997 | Carpenter | 710/66 |
| 5,860,094 A | 1/1999 | Junya | 711/5 |
| 5,973,628 A | 10/1999 | McDonnell | 341/67 |
| 6,003,122 A | 12/1999 | Yarch | 711/201 |
| 6,151,682 A | 11/2000 | van der Wal et al. | 713/401 |
| 6,175,911 B1 | 1/2001 | Oberman | 712/221 |
| 6,539,467 B1 | 3/2003 | Anderson | 711/219 |
| 6,829,697 B1 | 12/2004 | Davis et al. | 712/21 |
| 6,870,831 B2 | 3/2005 | Hughes et al. | 370/352 |
| 7,031,341 B2 | 4/2006 | Yu | 370/469 |
| 7,130,984 B2 | 10/2006 | Chard et al. | 711/219 |
| 2002/0174317 A1 | 11/2002 | Schroeder | 711/201 |

OTHER PUBLICATIONS

L. B. Arimilli, et al., Data Alignment Logic Comprising Mux to Mux Stages, IBM Technical Disclosure Bulletin, vol. 38, No. 7, Jul. 1995, pp. 501-504.

*Primary Examiner* — Vuthe Siek
(74) *Attorney, Agent, or Firm* — Winstead, P.C.

(57) ABSTRACT

A data aligner in a reconfigurable computing environment is disclosed. Embodiments employ hardware macros in field configurable gate arrays (FPGAs) to minimize the number of configurable logic blocks (CLBs) needed to shift bytes of data. The alignment mechanism allows flexibility, scalability, configurability, and reduced costs as compared to application specific integrated circuits.

8 Claims, 9 Drawing Sheets

DATA ALIGNER IN RECONFIGURABLE COMPUTING ENVIRONMENT

CROSS REFERENCE TO RELATED APPLICATIONS

The present application is a divisional application of co-pending U.S. patent application Ser. No. 11/230,956, entitled "Data Aligner in Reconfigurable Computing Environment," filed Sep. 20, 2005, which is incorporated by reference herein. The present application claims priority benefits to U.S. patent application Ser. No. 11/230,956 under 35 U.S.C. §121.

TECHNICAL FIELD

The present invention relates in general to data processing systems, and in particular, to mechanisms for aligning data bytes.

BACKGROUND INFORMATION

Data processing systems often require alignment and shifting of bytes within transmitted digital data. For example, bits or bytes of data may need to be right-justified or left-justified on a bus. In networked environments, packet headers from one protocol may be shifted compared to packet headers from another protocol. Such shifting functions may be accomplished in reconfigurable computing components such as field programmable gate arrays (FPGAs). Configurable logic blocks ("CLBs") within an FPGA may be configured into multiplexors that can be used for shifting functions. However, such implementations may be difficult to scale and require a great deal of CLBs, depending on the width of the data. Thus, there is a need in the art for mechanisms that allow scalability in data alignment functions implemented in reconfigurable computing environments such as FPGAs.

SUMMARY OF THE INVENTION

The present invention addresses the above issues by providing mechanisms for providing scalability in data alignment functions implemented in FPGAs.

An embodiment of the present invention is a network processor system having a field programmable gate array (FPGA). The FPGA includes a hardware multiplication macro and a plurality of configurable logic blocks (CLBs). The network processor system includes a multiplier configured from the hardware multiplication macro. The multiplier is coupled to a plurality of multiplexors that receive a digital signal from an input. The digital signal includes a sequence of data bytes. The network processor system includes a control element operatively coupled to the multiplier and operatively coupled to the plurality of multiplexors. The plurality of multiplexors are configured from the plurality of CLBs and coupled to an output. The multiplier receives the digital signal and the control element signals the multiplier and the plurality of multiplexors to shift the digital signal to result in an altered sequence of data bytes at the output.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention and its advantages, refer to the following description taken in conjunction with the accompanying drawings, in which.

DETAILED DESCRIPTION

Figure 1:
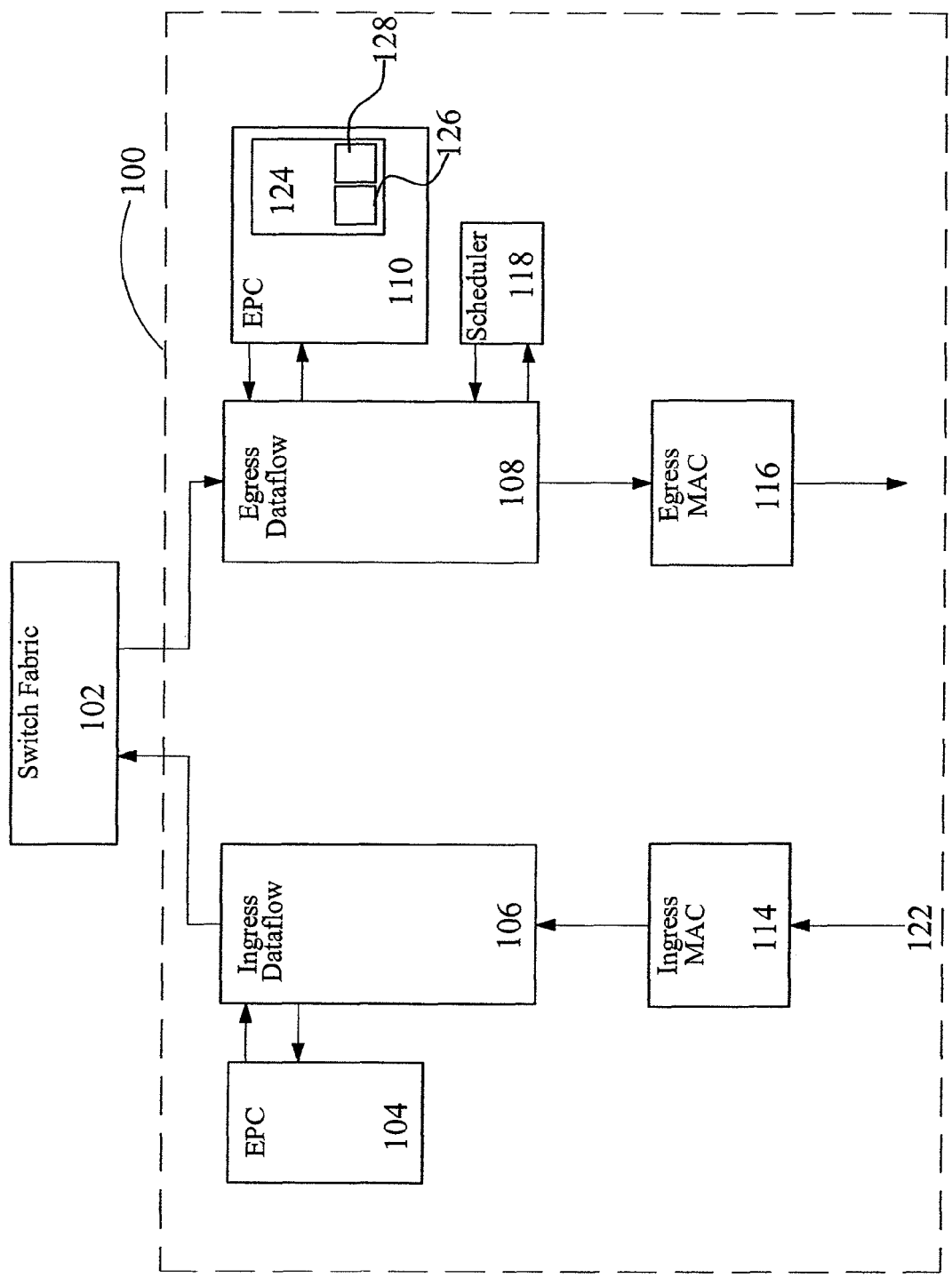
FIG. 1 illustrates a hardware environment for practicing an embodiment of the present invention.

In the following description, numerous specific details are set forth such as specific data bit lengths, byte lengths, multiplexor sizes, interface alignment patterns, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. Some details concerning timing considerations, detection logic, control logic, and the like have been omitted inasmuch as such details are not necessary to obtain a complete understanding of the present invention and are within the skills of persons of ordinary skill in the relevant art.

Data realignment functions are often needed in data flow logic of a networking chip. When a networking chip is implemented in FPGA technology, the data realignment function may be implemented with data multiplexors using configurable logic blocks ("CLBs"). Increasing the speed of networks may require wider data paths. Wider data paths translate into more alignment cases that require more multiplexors. With some schemes, increasing the width of data paths requires multiplexors with more inputs. Implementing such schemes for data realignment with FPGA technology may be difficult because it requires a large number of CLBs. In addition, such schemes may require an increased amount of programmable wiring resources. Therefore, some FPGA methods of data alignment may be difficult to scale to allow for increasing data path widths.

Embodiments of the present invention use hardware macros within an FPGA for accomplishing data alignment and data shifting. Using hardware macros within the FPGA reduces the need to use the FPGA's CLBs. Using these hardware macros rather than reconfiguring CLBs within an FPGA can be more efficient and economical. Also, using the hardware macros may be advantageous over designing and developing ASICs (application specific integrated circuits) for aligning data. Implementing circuits in FPGAs instead of ASICs can be advantageous when the flexibility of FPGAs is needed, when the very high density of ASICs is unnecessary, and when the lower design cost of FPGAs is important. Using hardware macros in FPGAs can be a way to make the FPGA design more dense, which, in turn, makes it less expensive. The hardware macros within the FPGA do not consume CLBs and, instead, only occupy a limited silicon area on the FPGA chip.

Refer now to the drawings wherein depicted elements are not necessarily shown to scale and like or similar elements may be designated by the same reference numeral through the several views.

FIG. 1 illustrates a functional block diagram for a Network Processor 100 which implements principles for data alignment in accordance with an embodiment of the present invention. Egress MAC (media access control) 116 and Ingress MAC 114 move data between Network Processor 100 and external physical-layer devices (not shown). Egress MAC 116 and Ingress MAC 114 can have numerous data mover units (DMUs, not shown) that can be configured independently as an Ethernet MAC or a POS interface. If a DMU is configured for Ethernet, it may support 1 Gigabit Ethernet, 10 Gigabit Ethernet, Fast Ethernet, or other such protocols. If a DMU is configured for POS mode, it may support OC-3c, OC-12, OC-12c, OC-48, OC-192c, OC-192, and other such protocols. Alternatively, Network Processor 100 may be configured to support different protocols such as IP, IPX, SONET, ATM, Frame Relay, etc. The hardware structures and example protocols listed are not meant to limit the subject matter of the claims, but instead are included to provide context for the description herein.

Ingress Dataflow (DF) 106 interfaces with Ingress MAC 114 to receive packets from physical devices (not shown) over input 122. The Ingress DF 106 collects the packet data in memory (not shown). Upon receiving sufficient data (e.g., the packet header), Ingress DF 106 enqueues the data to Embedded Processor Complex (EPC) 104 for processing. Once EPC 104 processes the packet, it provides forwarding information to Ingress DF 106. Ingress DF 106 then invokes flow-control mechanisms (not shown) and either discards the packet or places it in a queue to await transmission through Switch Fabric 102. Packets sent from Ingress DF 106 to Switch Fabric 102 may flow through a switch interface or other such hardware, which is omitted for clarity. Network Processor 100 may also include an "internal wrap" (not shown) that enables traffic to move between the Ingress DF 106 and Egress DF 108 without going through Switch Fabric 102.

Egress DF 108 interfaces with EPC 110, Egress MAC 116, and Switch Fabric 102. Packets received from Switch Fabric 102 are passed to Egress DF 108. Egress DF 108 collects the packet data in memory (not shown). The Egress DF 108 enqueues the packet either to the Egress Scheduler 118 or to a queue for transmission to Egress MAC 116. Egress DF 108 invokes flow-control mechanisms (not shown).

In an embodiment, EPC 104 and EPC 110 perform all processing functions for Network Processor 100. In general, the EPCs accept data for processing from DFs 106 and 108. The EPCs 104 and 110 determine what forwarding action is to be taken on the data. The data may be forwarded to its final destination or maybe be discarded. Each EPC may contain one or more Protocol Processor Units (PPU), such as PPU 124. PPU 124 may contain multiple processors, coprocessors, and hardware accelerators, which support functions such as packet parsing and classification, high-speed pattern search, and internal, chip management. PPU 124 may include one or more general data handlers (GDH), such as GDH 126, and one or more guided frame handlers (GFHs), such as GFH 128. GDH 126 and GFH 128 handle and forward packets for PPU 124 on behalf of EPC 110. In accordance with an embodiment of the present invention, Egress DF 108 is implemented in FPGA and performs data realignments as requested by PPU 124. Embodiments of the present invention using FPGAs and associated macros make it possible to easily configure and reconfigure components to allow compatibility with a range of existing and emerging protocols without the expense associated with ASICs.

Figure 2A:
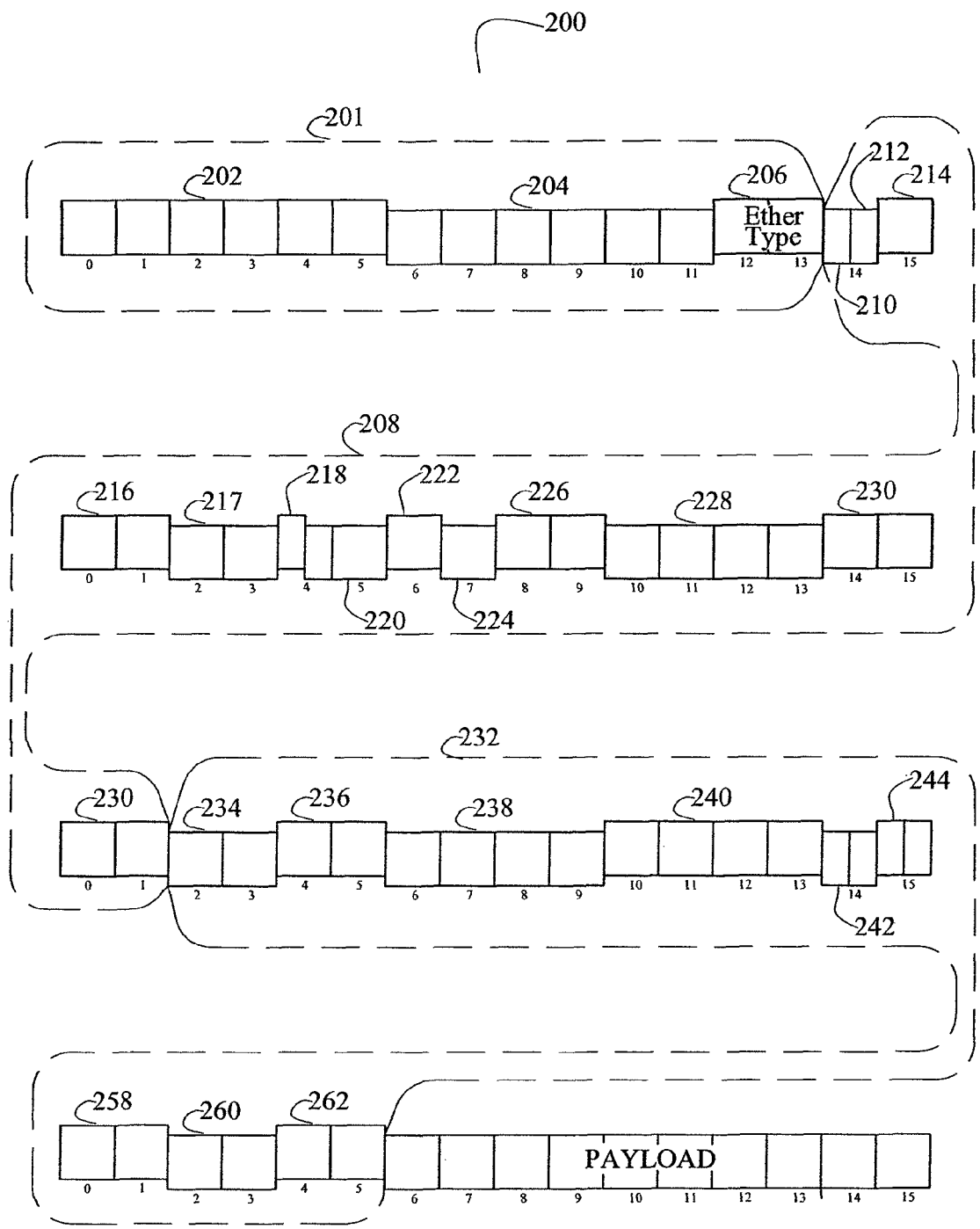
FIG. 2A illustrates an IPv4 Ethernet header that may be aligned in accordance with an embodiment of the present invention.

FIG. 2A illustrates Header 200 for a TCP IPv4 Ethernet IP (Internet Protocol) packet that can be aligned in accordance with principles of the present invention. For clarity and ease of identification, various fields in Header 200 are shown staggered from each other. Header 200 has a Layer 2 (L2) header 201 containing control information related to the Ethernet frame exchanged on a communication link. There are several variations of Ethernet networks, and correspondingly, several variations of L2 headers. Header 201 is a simple L2 header, corresponding to original Ethernet without options.

Header 200 contains a MAC DA field 202 which contains a destination address and 6 bytes (48 bits). MAC SA field 204 contains the source address and is 6 bytes (48 bits). Ethernet Type field 206 contains 2 bytes of identification information regarding the type of packet encapsulated in the Ethernet frame.

Layer 3 (L3) header 208 contains control information related to the IP packet encapsulated in the Ethernet frame. There are several optional features defined in IP networking; therefore, there are several variations of L3 headers. Layer 3 header 208 is an example of a simple L3 header, or one without IP options. Version field 210 contains 4 bits of version information that indicate the version of IP packet. HL field 212 contains 4 bits of information regarding the IP header length. TOS field 214 contains 8 bits of "type of service" information including priority information associated with the IP packet. IP Total Length field 216 contains 2 bytes of information on the length of the complete IP packet. Identifier field 217 is a 2 byte number associated with the IP packet. FLG field 218 contains 4 bits of flag information used to control a fragmentation mechanism. Fragmentation Offset field 220 contains 2 bytes used to indicate the position of an IP fragment in an original IP packet. TTL field 222 contains 8 bits of "time to live" information and is the number of routers that the IP packet can still cross. Protocol field 224 contains 8 bits used to identify the type of data encapsulated in the IP packet. Header Checksum field 226 contains 2 bytes used to detect errors in the received header. IP SA field 228 contains 4 bytes related to the IP source address. IP DA field 230 contains 4 bytes related to the IP destination address. Note that IP DA field 230 extends from the second quad word of header 200 to the third quad word of header 200.

Layer 4 (L4) header field 232 contains control information related to the TCP segment (piece of data) encapsulated in the IP packet. There are several optional features defined in TCP/IP networking. Correspondingly, there are several variations of L4 headers. Layer 4 header field 232 represents a simple variation of L4 header. SP field 234 contains 2 bytes of source port data used to identify the source of the TCP connection in the IP source. DP field 236 contains 2 bytes of Destination Port information related to identification of the destination of the TCP connection in the IP destination. Sequence Number field 238 contains 4 bytes used to identify the position of the TCP segment in the stream of TCP data. Ack Number field 240 contains 4 bytes used to identify the position of the latest data correctly received. HL field 242 contains 4 bits representing the header length. CB field 244 contains 6 Code Bits. Windows field 258 contains 2 bytes that indicate the position of the acknowledgement window. TCP checksum 260 contains 2 bytes used to detect errors in the complete TCP segment. Urgent Pointer field 262 contains 2 bytes used to indicate the position of urgent data. The payload of the Ethernet frame appears after L2 header 201, L3 header 208, and L4 header 232.

Figure 2B:
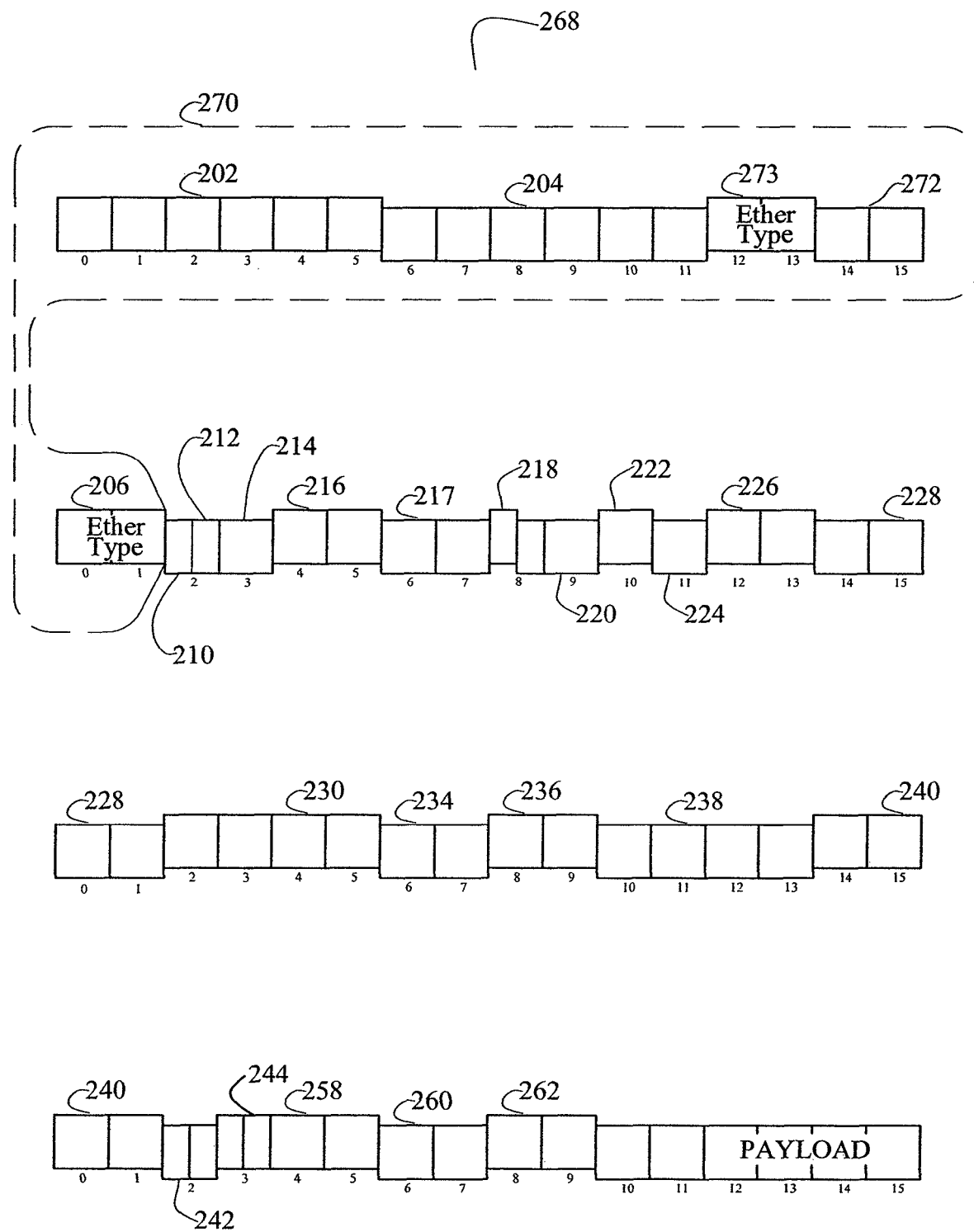
FIG. 2B illustrates the IPv4 Ethernet header from FIG. 2A aligned for compatibility with Ethernet 802.1q VLAN in accordance with an embodiment of the present invention.

FIG. 2B illustrates header 268 for a TCP IPv4 Ethernet packet under the IEEE specification 802.1q VLAN. Like-numbered items in FIGS. 2A and 2B correspond. Similar to header 200 (FIG. 2A), header 268 is an IP packet header. FIGS. 2A and 2B illustrate headers that are carried on 16-byte wide data paths that carry quad words of 16 bytes at each clock cycle. Header 268 differs from header 200 by the L2 header. Specifically, compared to L2, header 201, L2 header 270 is another variation of an Ethernet header that contains 4 additional bytes to support the VLAN option (Virtual Local Area Network). Other additional fields in header 268 (FIG. 2A) include TCI field 272, which contains tag control information and Ether Type field 273.

Comparing header 200 and header 268 (FIG. 2B), corresponding header positions in header 268 are "pushed" by 4 byte positions starting with the Ethernet type field 206 (FIG. 2A). In header 268, the Ethernet type field 206 (FIG. 2A) originally in quad word #1 byte positions 12-13 is pushed to quad word #2 byte positions 0-1 (FIG. 2B). This shift can be accomplished using principles of the present invention that utilize configurable FPGAs that contain multiplication macros that can be used for shifting header 200 to result in header 268.

Figure 3A:
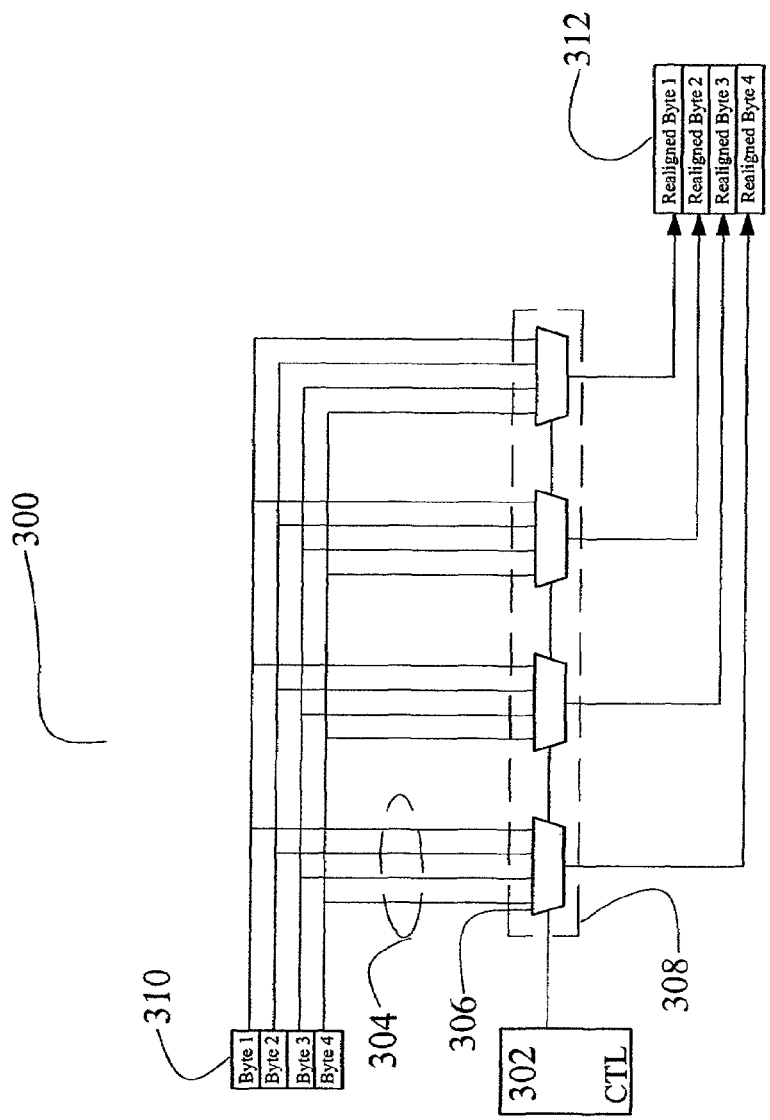
FIG. 3A illustrates a multiplexor-based alignment scheme that employs about 64 configurable logic block (CLBs) from a field programmable logic array (FPGA)
Figure 3B:
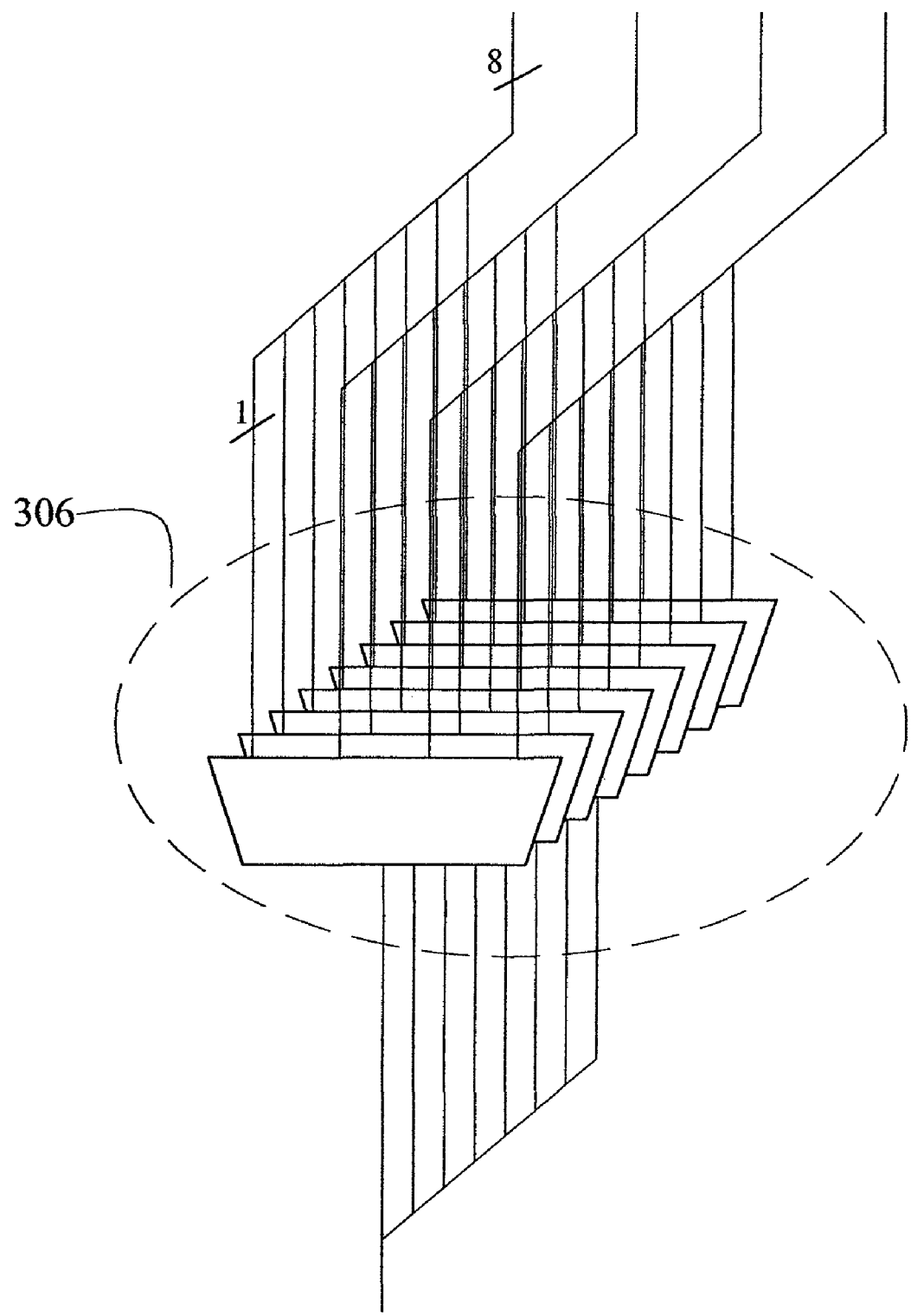
FIG. 3B illustrates the depth of multiplexors from FIG. 3A for handling 8-bit bytes, 4 bytes wide.

FIG. 3A illustrates a multiplexor-based data Realigner 300. Input 310 feeds 4-byte wide, 4:1 MUXs that collectively form MUX Bank 308. For example, four byte lines (shown as item 304) from Input 310 feed the four inputs of MUX 306. FIG. 3B illustrates a detail view of MUX 306, which shows that Realigner 300 handles a thirty-two bit word on 4-byte boundaries. Control Element 302 provides a control signal to MUX 306 that selects which line from Input 310 is sent to Output 312. In this way, Control Element 302 can shift Input 310 and provide the desired signal at output 312. As shown, Realigner 300 is four bytes wide. As shown in FIG. 3A, Realigner 300 requires approximately sixty-four CLBs to implement the MUXs required to implement the equivalent of thirty-two 4:1 MUXs needed for item 308. As discussed below embodiments of the present invention require fewer CLBs.

Figure 4:
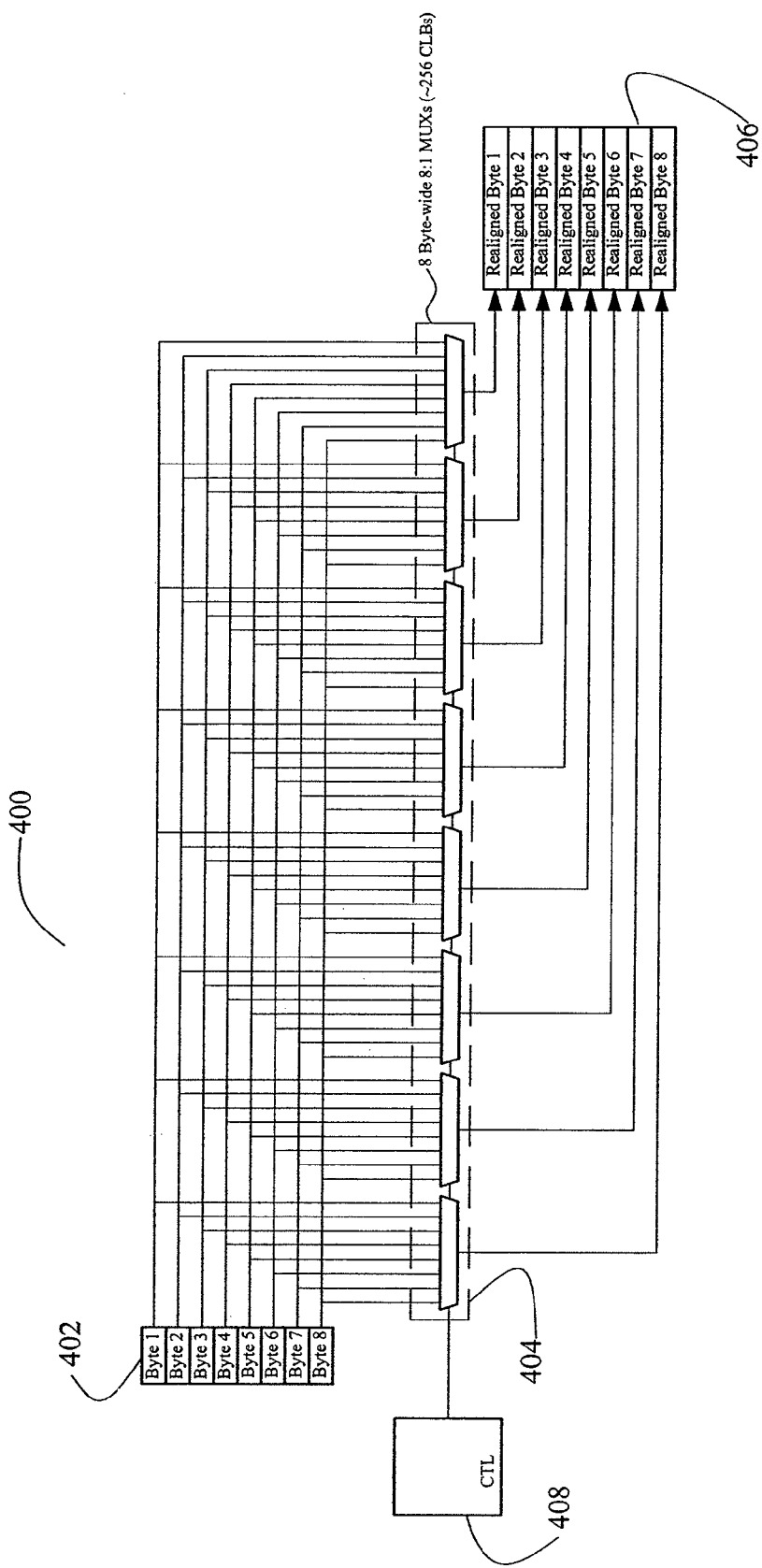
FIG. 4 illustrates a multiplexor-based alignment similar to that in FIG. 3A and configured to handle 8-bit bytes, 8 bytes wide to require about 256 CLBs from an FPGA.
Figure 5A:
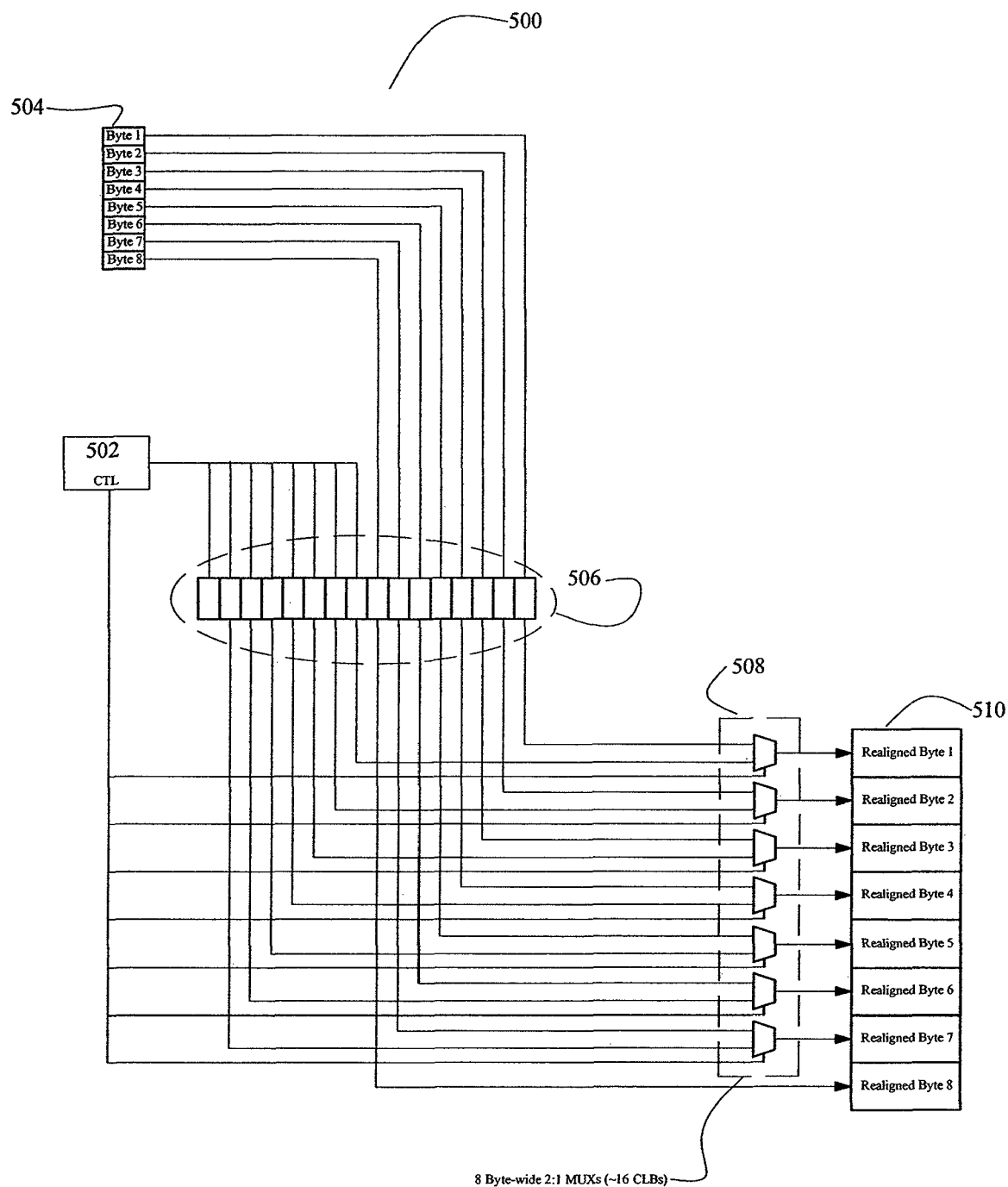
FIG. 5A illustrates an embodiment of the present invention which utilizes FPGA hardware macros for shifting an input and therefore only requires about 14 CLBs.

FIG. 4 illustrates a multiplexor-based data Realigner 400 similar to Realigner 300 (FIG. 3A). Input 402 is made of eight bytes that are eight bits deep. Control element 408 controls outputs from MUXs in MUX Bank 404 to achieve a realigned version of Input 402 at Output 406. Realigner 400 is an 8-byte wide realigner that is based on thirty-two bit words on byte boundaries. Using 8:1 MUXs for MUX Bank 404, Realigner 400 would employ about 256 CLBs in an FPGA. As shown in FIG. 5A, embodiments of the present invention may utilize multiplication macros to achieve shifting to allow using much fewer than 256 CLBs to achieve a more efficient realigner than Realigner 400 shown in FIG. 4.

Figure 5B:
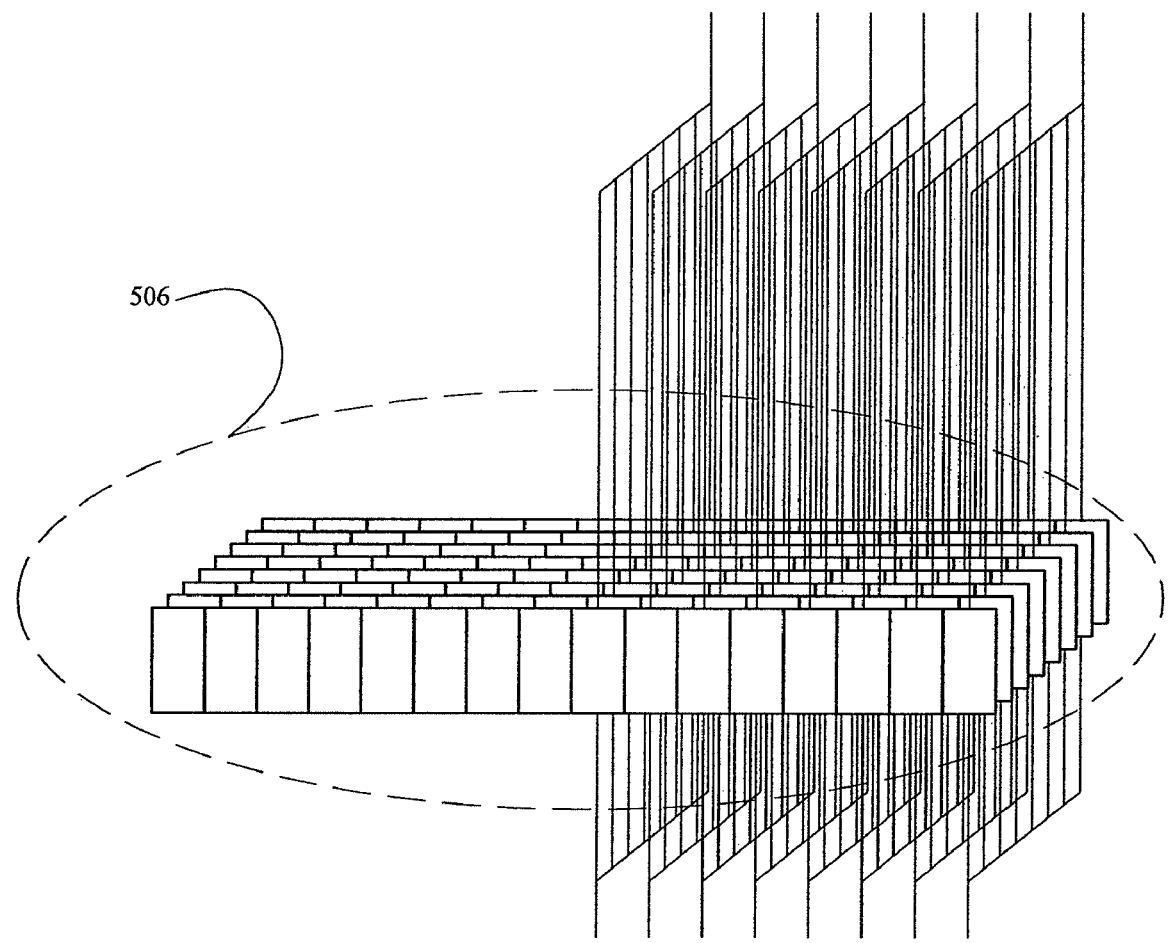
FIG. 5B illustrates that the multiplier in FIG. 5A has depth for handling 8-bit bytes, 8 bytes wide.

FIG. 5A illustrates an FPGA-based Realigner 500 which operates in accordance with the present invention. Input 504 is eight bytes wide and eight bits deep. Control Element 502 controls Multiplier 506 and the MUXs within MUX Bank 508. As shown in FIG. 5B, Multiplier 506 represents eight 8×8 multipliers that, in accordance with one embodiment of the present invention, are implemented using hardware macros within an FPGA. For example, Multiplier 506 could be implemented using a multiplication macro in a Virtex™ II FPGA provided by Xilinx™. If Control Element 502 sends a signal to Multiplier 506 to multiply by 2, Multiplier 506 shifts the signal on Input 504 by one position. In addition, to achieve a "wrap-around" function, Control Element 502 may signal the MUXs within MUX Bank 508 to replace the LSB (least significant byte) with the MSB (most significant byte). This results in a realigned version of Input 504 at Output 510.

As shown in FIG. 5A and FIG. 5B, Multiplier 506 consists of hardware multiplier macros that may consume no CLBs. Accordingly, Realigner 500 can be implemented using only about fourteen CLBs for the 7-byte-wide, 2:1 MUXs in MUXBank 508. This approximately fourteen CLBs required by Realigner 500 is significantly less than the approximately 256 CLBs required by the MUX-based Realigner 400 (FIG. 4A). Therefore, Realigner 500 utilizes FPGA hardware macros to reduce the number of FPGA CLBs required to implement a data realigner.

Figure 5C:
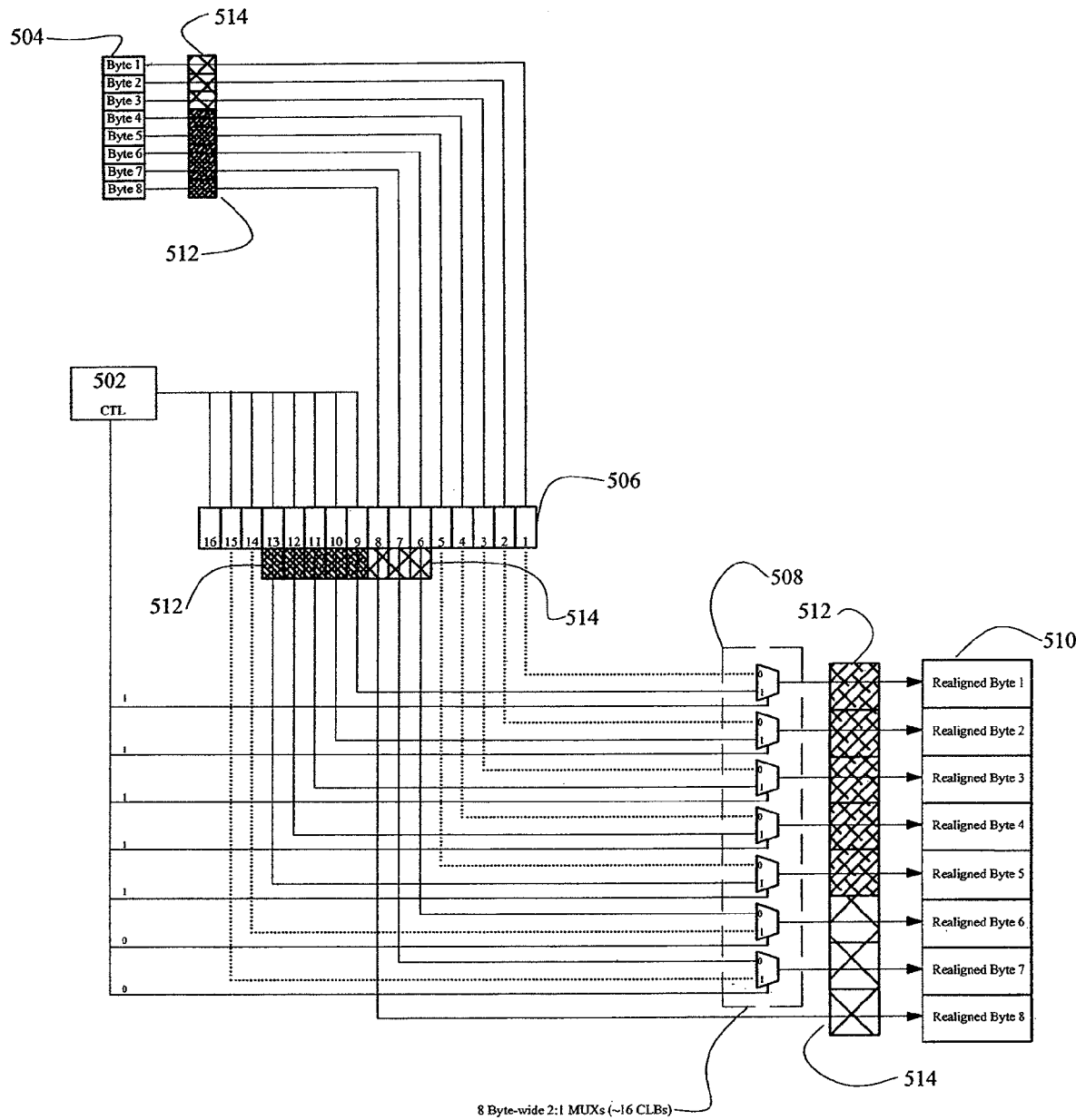
FIG. 5C further illustrates the alignment function of the circuit from FIG. 5A by showing the shifting of individual bytes of an input as the input progresses through the multiplier to the output.

FIG. 5C illustrates Realigner 500 from FIG. 5A used to shift a signal on Input 504 by five positions. Like-numbered items in FIGS. 5A, 5B, and 5C correspond. The first three bytes of the signal on Input 504 are shown similarly hatched as item 514. The last five bytes of the signal on Input 504 are similarly hatched as item 512. Input 504 is coupled to Multiplier 506. Control Element 502 signals Multiplier 506 to multiply by 32, which accomplishes a shift of five positions. Multiplying by 32 is equivalent to shifting five positions, since 2 taken to the fifth power equals 32. As shown in FIG. 5C, the first five positions (1-5) of the output of Multiplier 506 are not passed through to the outputs of MUX Bank 508. Instead, output positions 6-13 are used from Multiplier 506. Output positions 6-8 are used for outputting item 514 and Output positions 9-13 are used for outputting item 512. Correspondingly, Control Element 504 signals the MUXs in MUX Bank 508 such that item 514 are output as Realigned Bytes 6-8 at Output 510. In addition, Control Element 504 signals the MUXs in MUX Bank 508 such that item 512 is output as Realigned Bytes 1-5 at Output 510. In this manner, Realigner 500 can be used to shift an 8-byte wide input by five positions using only about fourteen CLBs in an FPGA. Rather than using more than about fourteen CLBs to accomplish such shifting, Realigner 500 uses hardware macros that are integral to the FPGA. This reduces costs, simplifies wiring requirements, and allows configurability that allow a developer to account for emerging needs.

Although the present invention and its advantages have been described in detail, it should be understood that various changes, substitutions, and alterations could be made herein without departing from the spirit and scope of the invention as defined by the appended claims.

What is claimed is:

1. A network processor system comprising:
 a field programmable gate array (FPGA) comprising a hardware multiplication macro and a plurality of configurable logic blocks (CLBs);
 a multiplier configured from the hardware multiplication macro, wherein the multiplier is coupled to a plurality of multiplexors coupled to an output and the multiplier receives a digital signal from an input, wherein the digital signal includes a plurality of data bytes; and
 a control element operatively coupled to the multiplier and to the plurality of multiplexors, the plurality of multiplexors configured from the plurality of CLBs, wherein the control element signals the multiplier and signals the plurality of multiplexors to shift the plurality of data bytes to result in an altered digital signal at the output.

2. The network processor system of claim 1, wherein each of the plurality multiplexors is a 2:1 multiplexor.

3. The network processor system of claim 1, further comprising the control element coupled to a memory that stores a lookup table, wherein the control element signals the plurality of multiplexors based on data stored in the lookup table.

4. The network processor system of claim 1, wherein the sequence of data bytes comprises a first header of a first protocol, wherein the altered digital signal comprises a second header of a second protocol.

5. The network processor system of claim 1, wherein the multiplier is 8 bytes wide and 8 bits deep.

6. The network processor system of claim 1, wherein the multiplier is 16 bytes wide and 8 bits deep.

7. The network processor of claim 1, wherein the digital signal includes a plurality of most significant bytes and a plurality of least significant bytes, wherein the digital signal is shifted by a number X bytes, wherein X of the most significant bytes of the digital signal are wrapped around to the least significant bytes of the digital signal to result in the altered digital signal.

8. The network processor of claim 4, wherein the first protocol and second protocol are Ethernet protocols.

* * * * *